US006253402B1

United States Patent
Lin

(10) Patent No.: US 6,253,402 B1
(45) Date of Patent: *Jul. 3, 2001

(54) AIR BED STRUCTURE CAPABLE OF ALTERNATE LYING THEREON ON EITHER OF ONE'S SIDES

(76) Inventor: Joenne Lin, No. 81, Rong Xing Street, Ping Zhen City, Tao Yuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/336,349

(22) Filed: Jun. 18, 1999

(30) Foreign Application Priority Data

Oct. 9, 1998 (TW) .................................................. 87216744

(51) Int. Cl.[7] .................................................. A47G 27/10
(52) U.S. Cl. .............................. 5/713; 5/710; 137/625.21
(58) Field of Search .................................. 5/713, 710, 706, 5/715, 654, 655.3; 137/625.21, 596.17

(56) References Cited

U.S. PATENT DOCUMENTS

| 3,388,701 | * | 6/1968 | Schreiber et al. | 137/624.14 X |
|---|---|---|---|---|
| 3,462,778 | * | 8/1969 | Whitney | 5/713 |
| 3,656,190 | * | 4/1972 | Regan et al. | 5/713 X |
| 3,678,520 | * | 7/1972 | Evans | 5/713 |
| 3,919,730 | * | 11/1975 | Regan | 5/710 |
| 4,197,837 | * | 4/1980 | Tringali et al. | 5/713 X |
| 4,225,989 | * | 10/1980 | Corbett et al. | 5/713 |
| 4,622,706 | * | 11/1986 | Takeuchi | 5/713 |
| 4,825,486 | * | 5/1989 | Kimura et al. | 5/713 |
| 4,949,414 | * | 8/1990 | Thomas et al. | 5/713 |
| 5,035,016 | * | 7/1991 | Mori et al. | 5/713 |
| 5,052,067 | * | 10/1991 | Thomas et al. | 5/713 |
| 5,109,561 | * | 5/1992 | Schild | 5/713 |
| 5,117,518 | * | 6/1992 | Schild | 5/713 |
| 5,193,237 | * | 3/1993 | Holdredge | 5/654 |
| 5,379,471 | * | 1/1995 | Holdredge | 5/655.3 |
| 5,533,217 | * | 7/1996 | Holdredge | 5/713 X |
| 5,920,934 | * | 7/1999 | Hannagan et al. | 137/625.21 X |
| 6,058,538 | * | 5/2000 | Chapman et al. | 5/713 |
| 6,108,843 | * | 8/2000 | Suzuki et al. | 5/713 |
| 6,152,176 | * | 11/2000 | Lin | 137/625.21 |

FOREIGN PATENT DOCUMENTS

2134382 * 8/1984 (GB) .................................. 5/713

* cited by examiner

Primary Examiner—Anthony Knight
Assistant Examiner—Robert G. Santos
(74) Attorney, Agent, or Firm—Pro-Techtor International Services

(57) ABSTRACT

An air bed structure capable of alternate lying thereon on either of one's sides, wherein, the air bed is divided into an upper and a lower layer, each layer is divided into a right and a left part each being comprised of an air bladder. A U typed air bladder is provided between the upper and the lower layers. The air bladders are arranged to cooperate with two specific air valves, multiple pipe lines and a controlling electronic circuit to provide various aeration states including single air-bladder aeration on both sides of the air bed, single air-bladder aeration on one side of the air bed, both air-bladder aeration on one side of the air bed, single air-bladder aeration on the other side of the air bed and both air-bladder aeration on the other side of the air bed etc. Thereby a patient lying on the air bed can adjust the aeration state of the air bed in pursuance of requirement. The body of the patient can be raised to rotate rightward, leftward by making a small or big turning of his body. This is extremely ideal and convenient for patients and old people.

2 Claims, 15 Drawing Sheets

AIR BED STRUCTURE CAPABLE OF ALTERNATE LYING THEREON ON EITHER OF ONE'S SIDES

BACKGROUND OF THE INVENTION

1. Field of the Invention

The present invention is related to an air bed structure capable of alternate lying thereon on either of one's sides. And is especially related to an air bed structure of which the aeration functions, except that for lying on one's back, further include single air-bladder aeration on both sides of the air bed, single air-bladder aeration on one side of the air bed, both air-bladder aeration on one side of the air bed, single air-bladder aeration on the other side of the air bed and both air-bladder aeration on the other side of the air bed.

2. Description of the Prior Art

A serious ill patient generally needs lying on a bed for several decades of days, several years or for the whole life long. Lying for years on a bed makes him contact the mattress with his back, buttocks, the skins on these areas will get decubitus by long pressing and bad aeration, and getting rotten skin is the worse. In view of this, the art of medical instrument has had studied and developed air beds which are capable of separate aeration and discharging, in order that time of being pressed of skins may be reduced as much as possible. However, conventional air beds only has too simple function to satisfy the patients' requirement by virtue that an air bed is only divided into several air bladders which are alternately aerated and discharged.

SUMMARY OF THE INVENTION

In view of the non-ideally practical function of the conventional air beds, the inventor studied and develops the present invention to provide an ideal and practical air bed with its novel structure as well as effect for the patients lying long thereon.

The direct object of the present invention is to provide an air bed structure capable of alternate lying thereon on either of one's sides. Wherein, the air bed is divided into four parts, i.e., an upper left side, a lower left side, an upper right side and a lower right side part. In this way, two air valves with unique structural design and with unique piping arrangement as well as electronic control are provided to render the air bladders of the four parts to have various states of aeration and discharging. Thereby, with the present invention, an object of getting the single air-bladder aeration on both sides of the air bed, the single air-bladder aeration on one side of the air bed, both air-bladder aeration on one side of the air bed, the single air-bladder aeration on the other side of the air bed or both air-bladder aeration on the other side of the air bed to make a large turning or a small turning on the bed for lying on either of one's sides can be achieved for a patient.

The present invention will be apparent in its composition of structure and the effect created after reading the detailed description of the preferred embodiment thereof in reference to the accompanying drawings.

DETAILED DESCRIPTION OF THE PREFERRED EMBODIMENT

Figure 1:
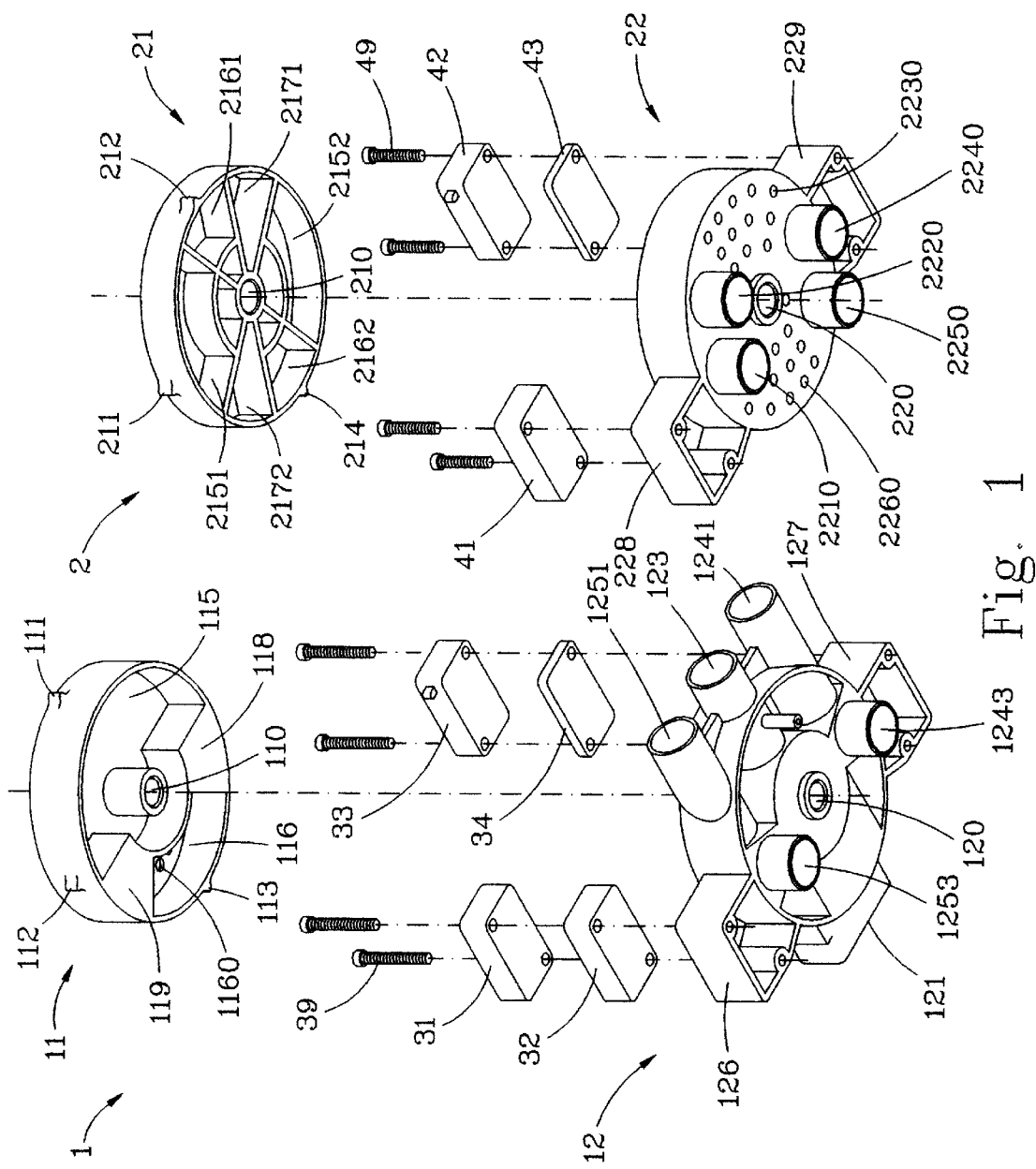
FIG. 1 is an analytic perspective view of two air valves of the present invention.
Figure 2:
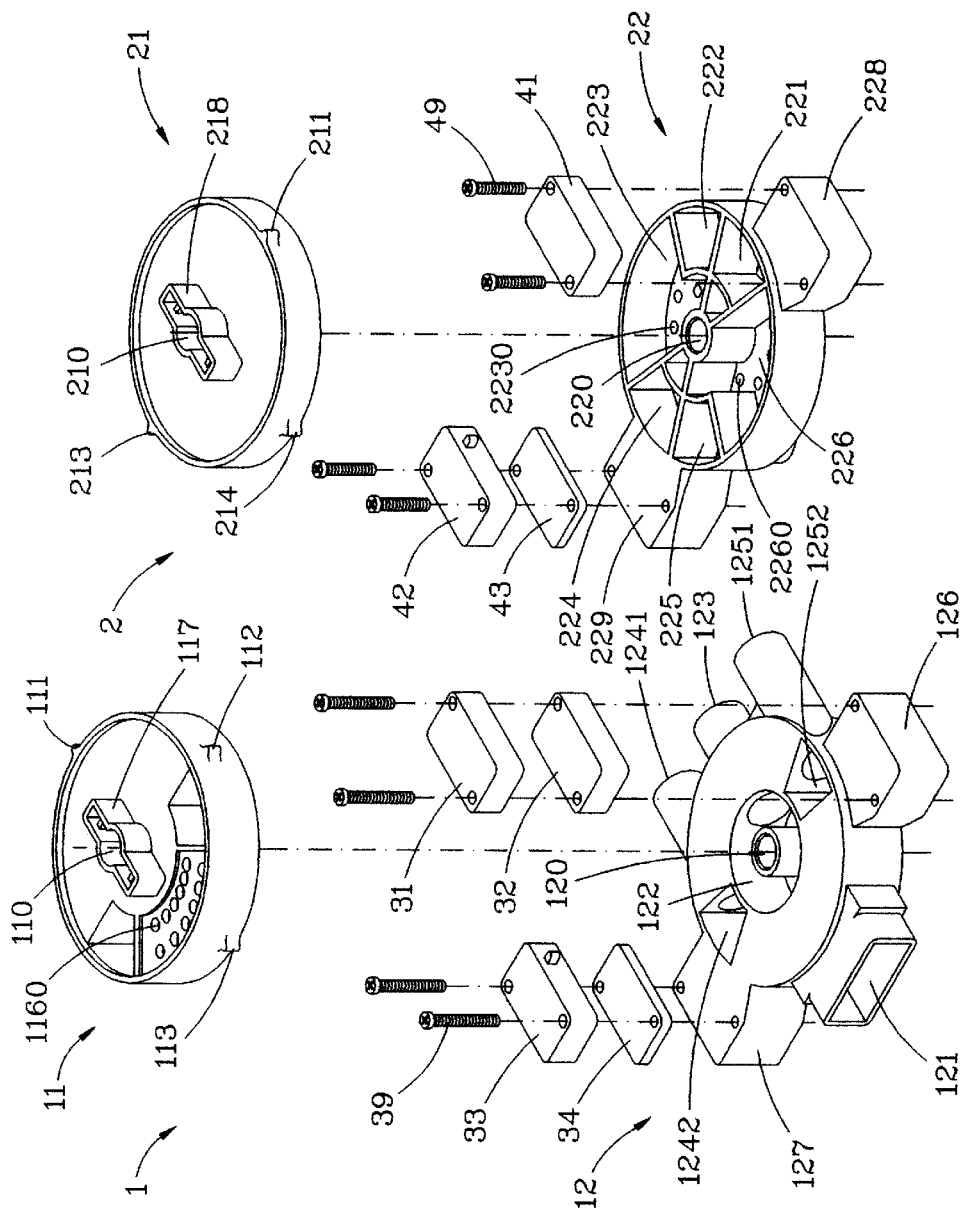
FIG. 2 is another analytic perspective view of two air valves of the present invention.
Figure 3:
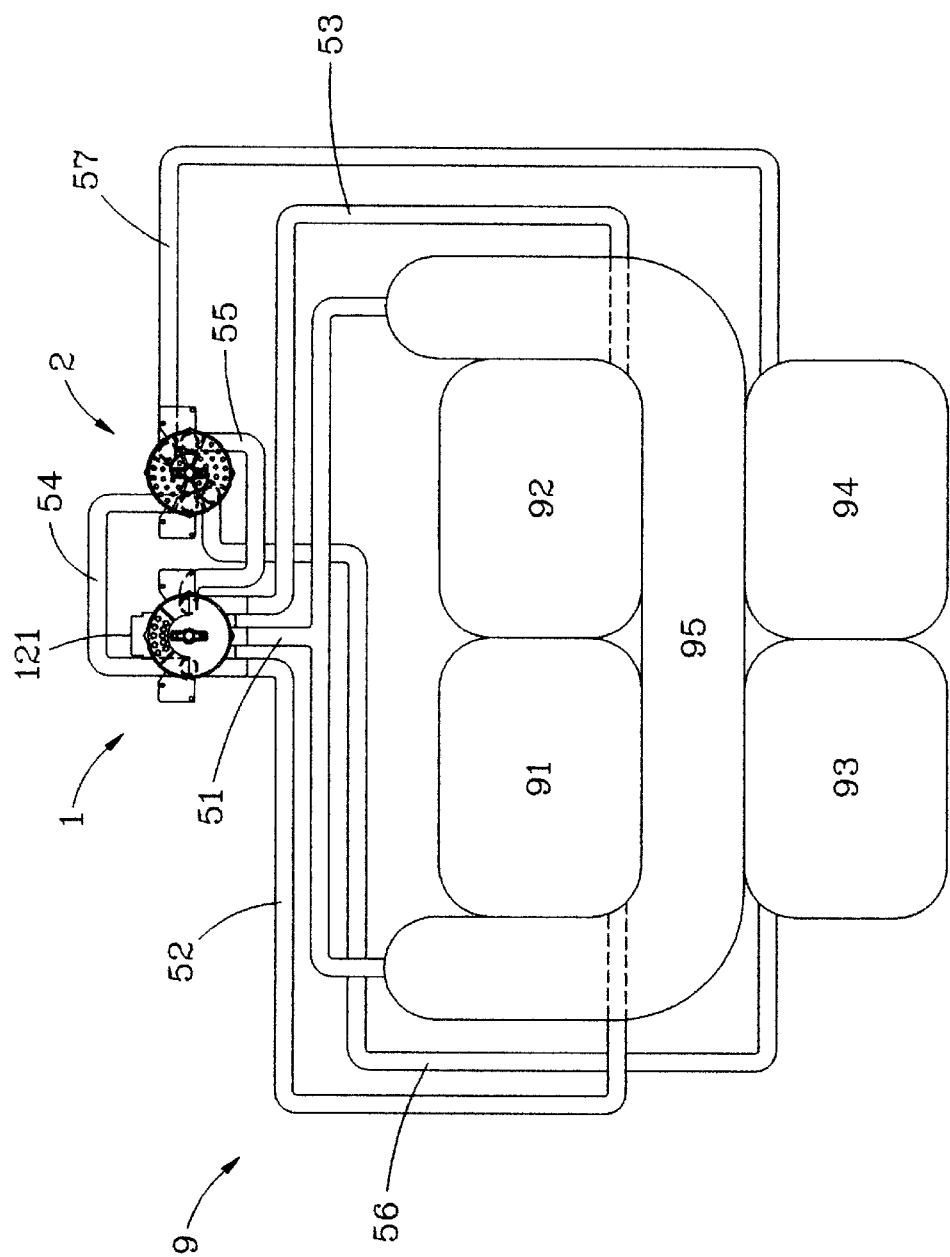
FIG. 3 is a schematic view showing connection of the two air valves and the air bed of the present invention.

Referring to FIGS. 1, 2 and 3, the present invention is comprised mainly of a first air valve 1, a second air valve 2 and an air bed 9. By controlling aeration of the first air valve 1 and the second air valve 2, various states of aeration and discharging of the air bed 9 can be provided.

Wherein, the first air valve 1 is comprised of an upper rotation lid 11 and a lower seat 12, the upper rotation lid 11 is mounted on the lower seat 12. The upper rotation lid 11 and the lower seat 12 are provided at the centers thereof respectively with a through hole 110 and a through hole 120. A driving member 117 is provided on the top of the upper rotation lid 11, thereby, an external motor (not shown) can drive the upper rotation lid 11 to rotate, while the lower seat 12 maintains unmoved. The top surface of the upper rotation lid 11 is a sealed surface; a big air chamber 115 and a small air chamber 116 are formed beneath the top surface. Area of the big air chamber 115 is larger than that of the small air chamber 116; a block 119 and a block 118 are provided between them. The top of the small air chamber 116 is provided with a plurality of discharge holes 1160. The upper rotation lid 11 is provided on the external annular wall thereof with four lugs 111, 112, 113 and 114 separated one from another by an angle of about 90 degrees, the lugs 111, 112, 113 and 114 are not at the same level relatively. The lower seat 12 is in the form quite similar to the upper rotation lid 11, it is provided appropriately on the wall of its peripheral side with a transverse main intake 121. The lower seat 12 is provided centrally thereof with an annular air chamber 122 which is communicated with the transverse main intake 121. A transverse central discharge pipe 123 is provided on the external wall of the lower seat 12 opposite to the transverse main intake 121 and is communicated with the annular air chamber 122. In other words, the transverse main intake 121 is communicated with the transverse central discharge pipe 123. The transverse central discharge pipe 123 is provided at both sides thereof respectively with an air pipe 1251 and an air pipe 1241. While the annular air chamber 122 is provided at both sides thereof respectively with an air chamber 1252 and an air chamber 1242 which are opened on their tops. The air chamber 1252 and the air chamber 1242 are provided on the bottoms thereof respectively with a vertical lower air pipe 1253 and a vertical lower air pipe 1243 communicating respectively with the interiors of the air pipe 1251 and the air pipe 1241. The air chambers 1252 and 1242 of the lower seat 12 are provided at the outer lateral sides thereof respectively with a receiving seat 126 and a receiving seat 127 for mounting therein two micro-switches 31, 32 as well as a micro-switch 33 and a pad 34 by a plurality of screws 39.

The second air valve 2 is comprised of an upper rotation lid 21 and a lower seat 22, the upper rotation lid 21 is mounted on the lower seat 22. The upper rotation lid 21 and the lower seat 22 are provided at the centers thereof respectively with a through hole 210 and a through hole 220. A driving member 218 is provided on the top of the upper rotation lid 21, thereby, an external motor (not shown) can drive the upper rotation lid 21 to rotate, while the lower seat 22 maintains unmoved. The top surface of the upper rotation lid 21 is a sealed surface; a plurality of air chambers 2151, 2161, 2171 and air chambers 2152, 2162, 2172 symmetrically arranged relatively to the formers are formed beneath the top surface. The upper rotation lid 21 is provided on the external annular wall thereof with four lugs 211, 212, 213 and 214 separated one from another by an angle of about 90 degrees, the lugs 211, 212, 213 and 214 are not at the same level. The lower seat 22 is in the form quite similar to the upper rotation lid 21; the bottom thereof is a sealed surface. Above the bottom surface, there are a first air chamber 221, a second air chamber 222, a third air chamber 223, a fourth air chamber 224, a fifth air chamber 225 and a sixth air chamber 226. The bottoms of the air chambers 223 and 226 are provided respectively with a plurality of discharge holes 2230 and 2260. The bottoms of the air chambers 221, 222, 224 and 225 are provided respectively vertically with an air pipe 2210 (2220, 2240, 2250). The lower seat 22 is provided at the outer lateral sides thereof with a receiving seat 228 and a receiving seat 229 for mounting therein respectively a micro-switch 41 as well as a micro-switch 42 and a pad 43 by a plurality of screws 49. In the present invention, any micro-switch (31, 32, 33; and 41, 42) contacting with a corresponding lug (111, 112, 113 and 114; 211, 212, 213 and 214) at the same level will make turning off of its corresponding motor to stop rotation of its corresponding upper rotation lid (11, 21).

The air bed 9 is comprised of a plurality of elongate air bladders 91, 92, 93, 94 and 95. Wherein, the elongate air bladders 91 and 92 are provided on an upper layer, while the elongate air bladders 93 and 94 are provided on a lower layer. The elongate air bladder 95 is provided between the upper layer and the lower layer and extends to the two lateral sides of the elongate air bladders 91 and 92 to be used as a protection cushion.

Figure 11:
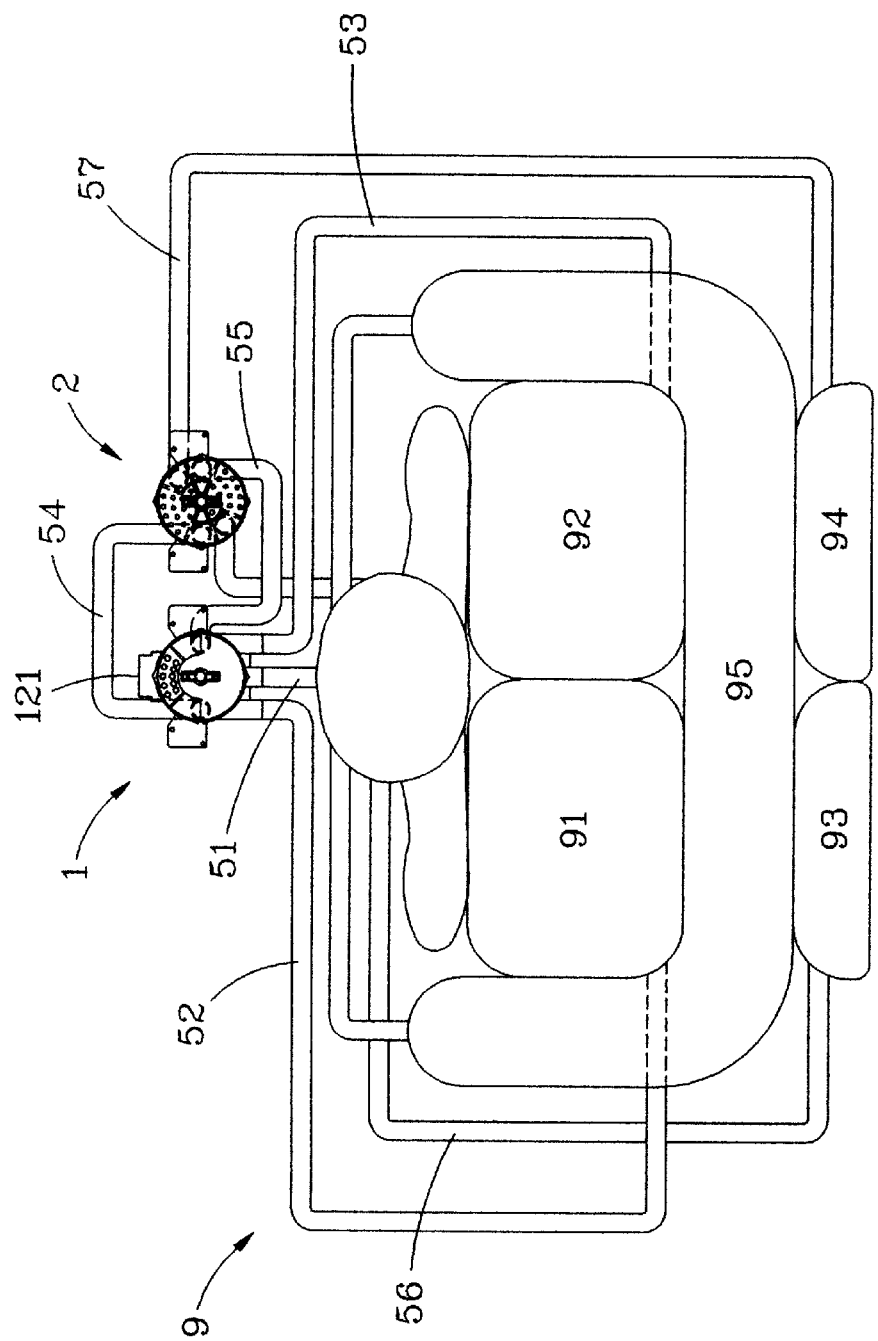
FIG. 11 is a schematic view showing the state of the air bed in aeration of a single air-bladder on both sides of the air bed of the present invention.
Figure 12:
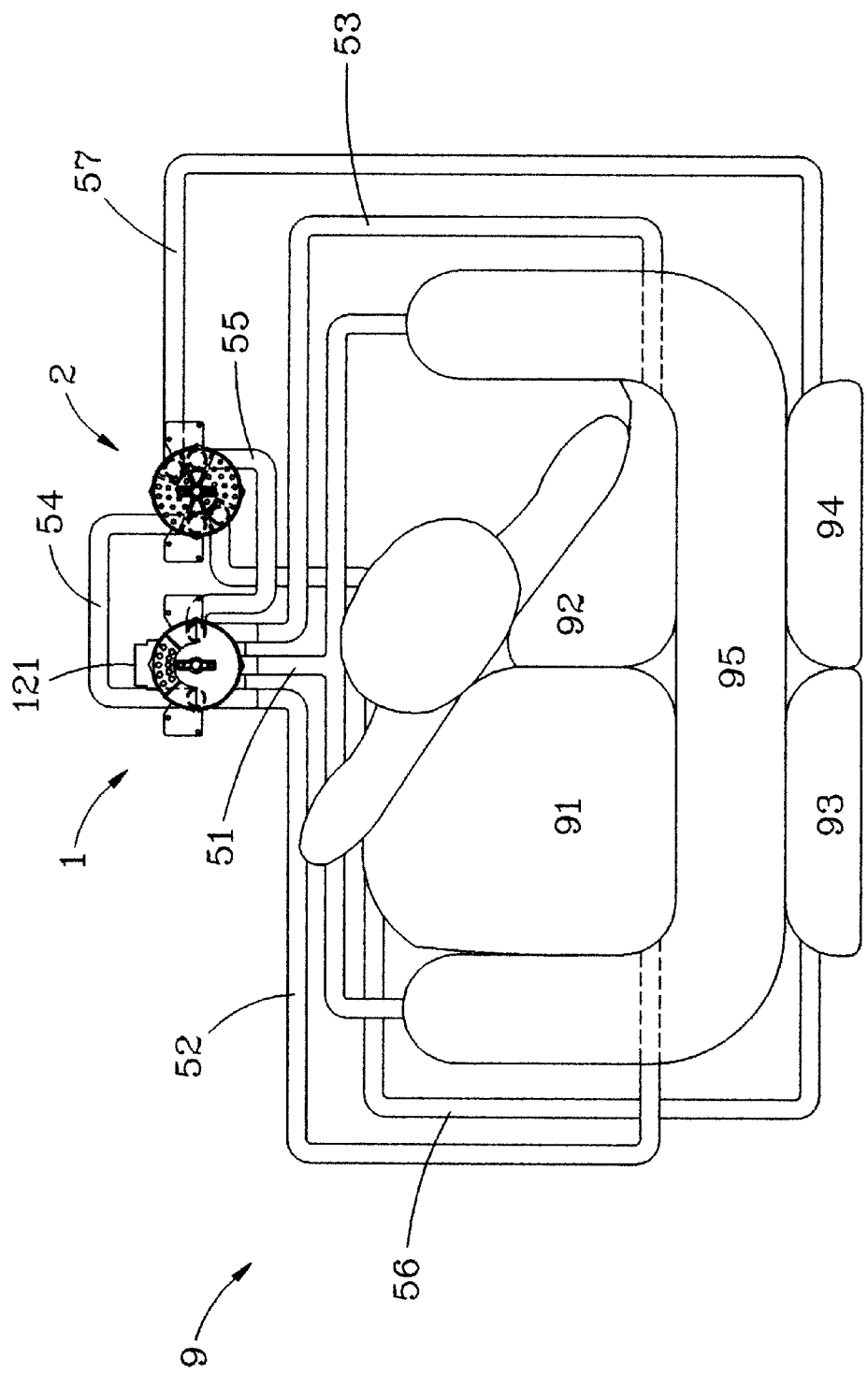
FIG. 12 is a schematic view showing the state of the air bed in aeration of a single air-bladder on one side of the air bed of the present invention.
Figure 13:
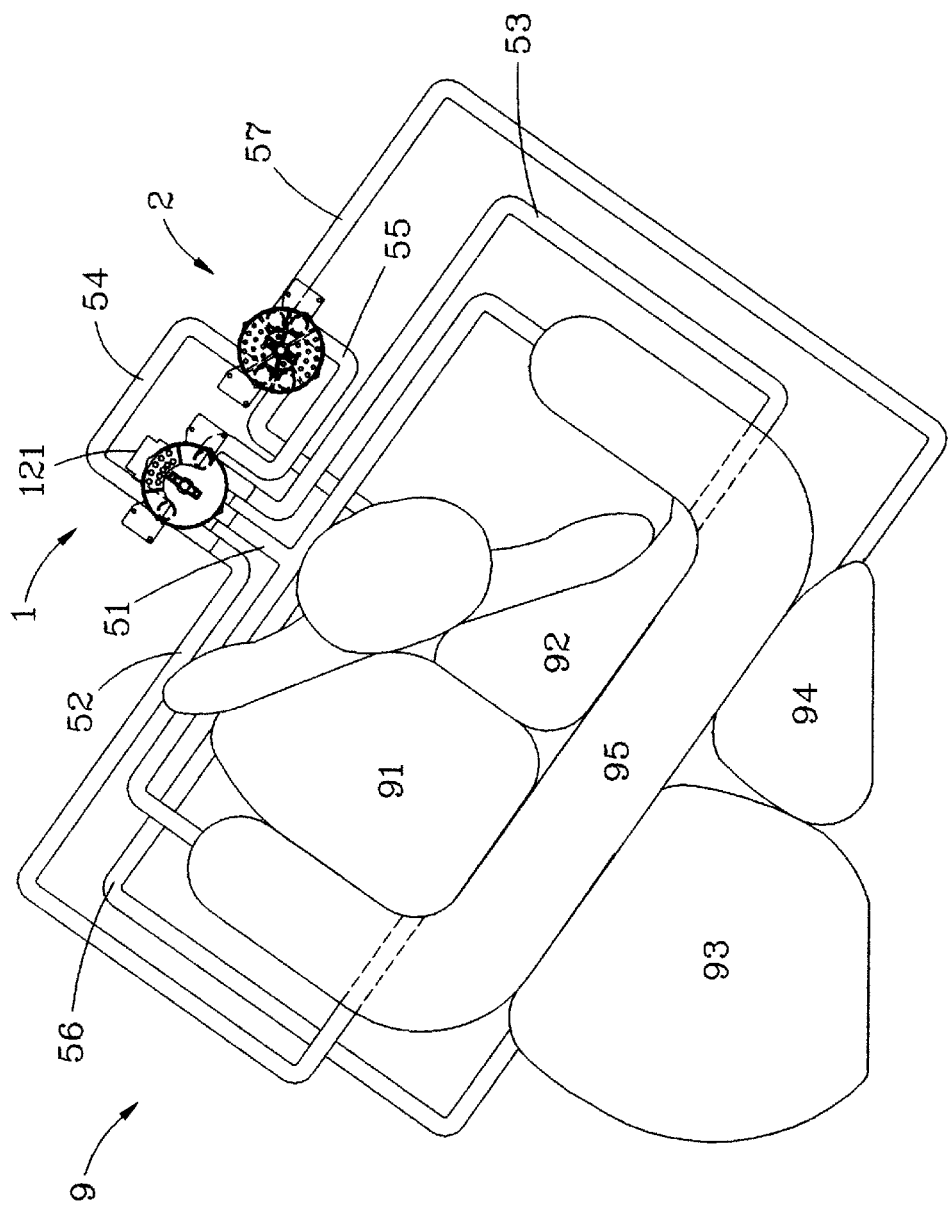
FIG. 13 is a schematic view showing the state of the air bed in aeration of both air-bladders on one side of the air bed of the present invention.
Figure 14:
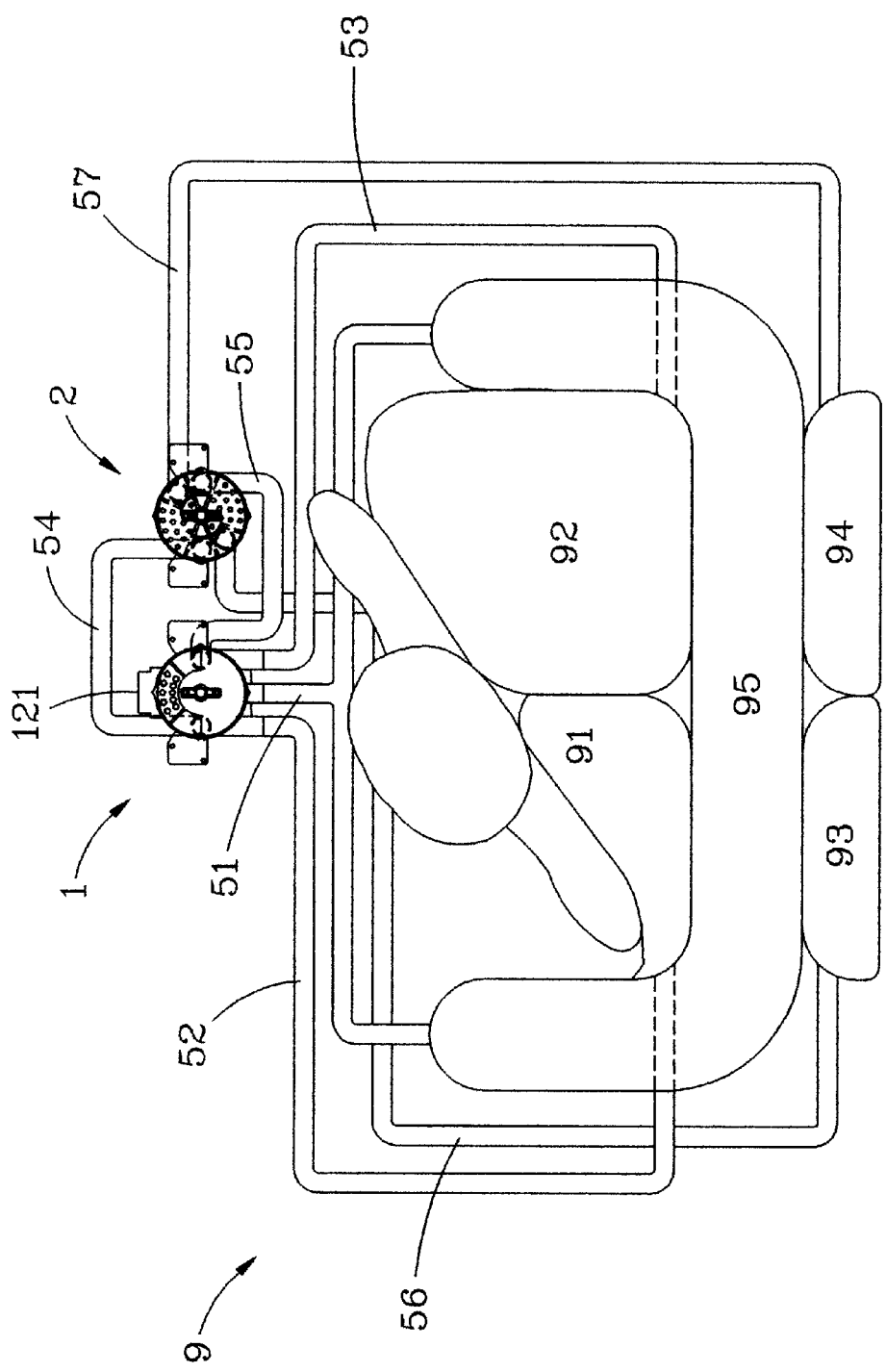
FIG. 14 is a schematic view showing the state of the air bed in aeration of a single air-bladder on the other side of the air bed of the present invention.
Figure 15:
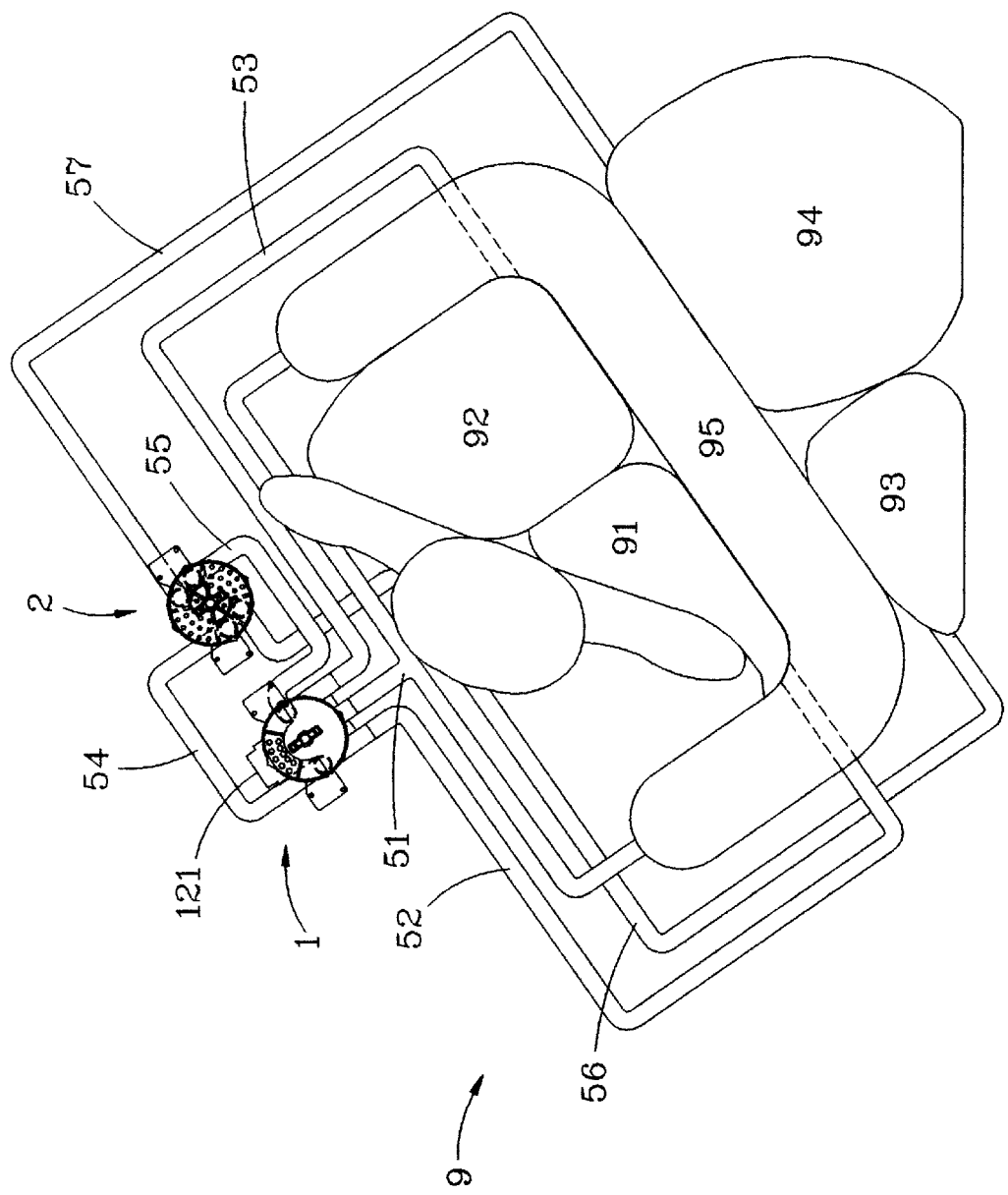
FIG. 15 is a schematic view showing the state of the air bed in aeration of both air-bladders on the other side of the air bed of the present invention.

Terminology of the functions of the air bed 9 is listed below in the first place:

aeration of a single air-bladder on both sides of the air bed: the air bladders 91, 92 and 95 are all aerated, while the air bladders 93 and 94 are discharged (as shown in FIG. 11).

aeration of a single air-bladder on one side of the air bed: the air bladders 91 and 95 are aerated, while the air bladders 92, 93 and 94 are discharged, now a person can lie on one side of him on the bed (as shown in FIG. 12).

aeration of both air-bladders on one side of the air bed: the air bladders 91, 93 and 95 are aerated, while the air bladders 92 and 94 are discharged, now a person can lie on one side of him on the bed by turning his body nearly 90 degrees (as shown in FIG. 13).

aeration of a single air-bladder on the other side of the air bed: the air bladders 92 and 95 are all aerated, while the air bladders 91, 93 and 94 are discharged, now a person can lie on the other side of him on the bed (as shown in FIG. 14).

aeration of both air-bladders on the other side of the air bed: the air bladders 92, 94 and 95 are aerated, while the air bladders 91 and 93 are discharged, now a person can lie on the other side of him on the bed by turning his body nearly 90 degrees (as shown in FIG. 15).

The above stated functions are described now referring to the connections shown in FIG. 3 of the drawings: The main intake 121 is connected to an external air supply pump (not shown); the central discharge pipe 123 is connected to the elongate air bladder 95 via a pipe line 51; the air pipe 1251 is connected to the air bladder 91 via a pipe line 52; the vertical lower air pipe 1253 is connected to the air pipe 2210 via a pipe line 54; the air pipe 1241 is connected to the air bladder 92 via a pipe line 53; the vertical lower air pipe 1243 is connected to the air pipe 2240 via a pipe line 55; the air pipe 2220 is connected to the air bladder 93 via a pipe line 56; and the air pipe 2250 is connected to the air bladder 94 via a pipe line 57.

It shall be explained in the first place that, when the main intake 121 intakes air, air can be delivered to the central discharge pipe 123 to aerate the air bladder 95. The air bladder 95 is always aerated in operation of the present invention. The present invention further includes external electronic circuit soft wares and hard wares to appropriately control rotation and rotating time of the upper rotation lids 11, 21.

Figure 4:
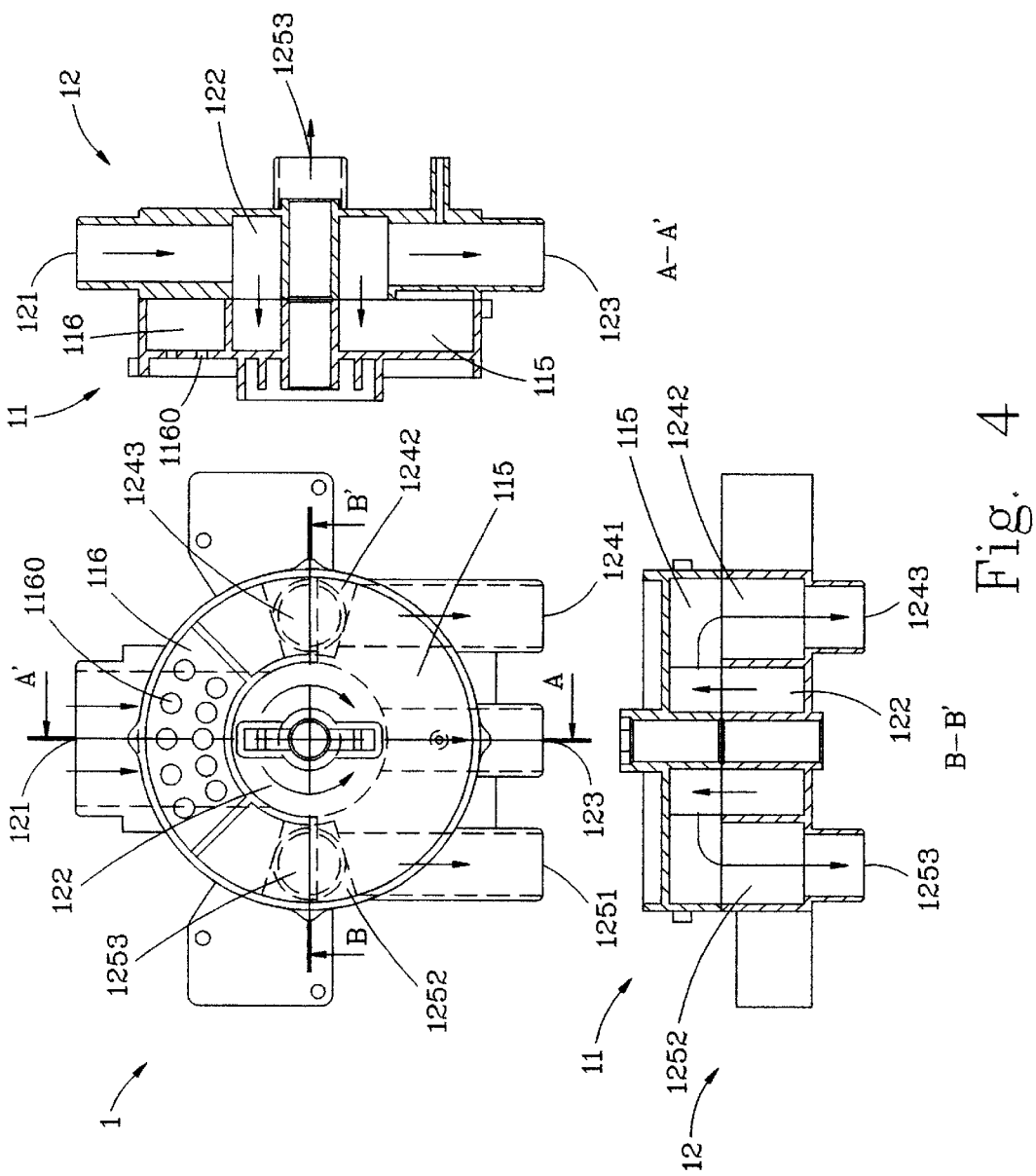
FIG. 4 is a schematic view showing the state of the first air valve of the present invention in complete aeration.

The functions of aeration as well as discharging of the two air valves in pursuance of their rotating positions are now described referring to the drawings:

Referring to FIG. 4 which shows the state of the first air valve 1 of the present invention in complete aeration: When the upper rotation lid 11 of the first air valve 1 is in the state shown in FIG. 4, the big air chamber 115 of the upper rotation lid 11 exactly covers the annular air chamber 122 of the lower seat 12 and the air chambers 1252 and 1242. Therefore, air is taken in from the main intake 121, and flows through the annular air chamber 122 into the big air chamber 115 and then gets into the air chambers 1252 and 1242. Hence the air pipes 1251 and 1241, the lower air pipes 1253 and 1243 are all filled with air.

Figure 5:
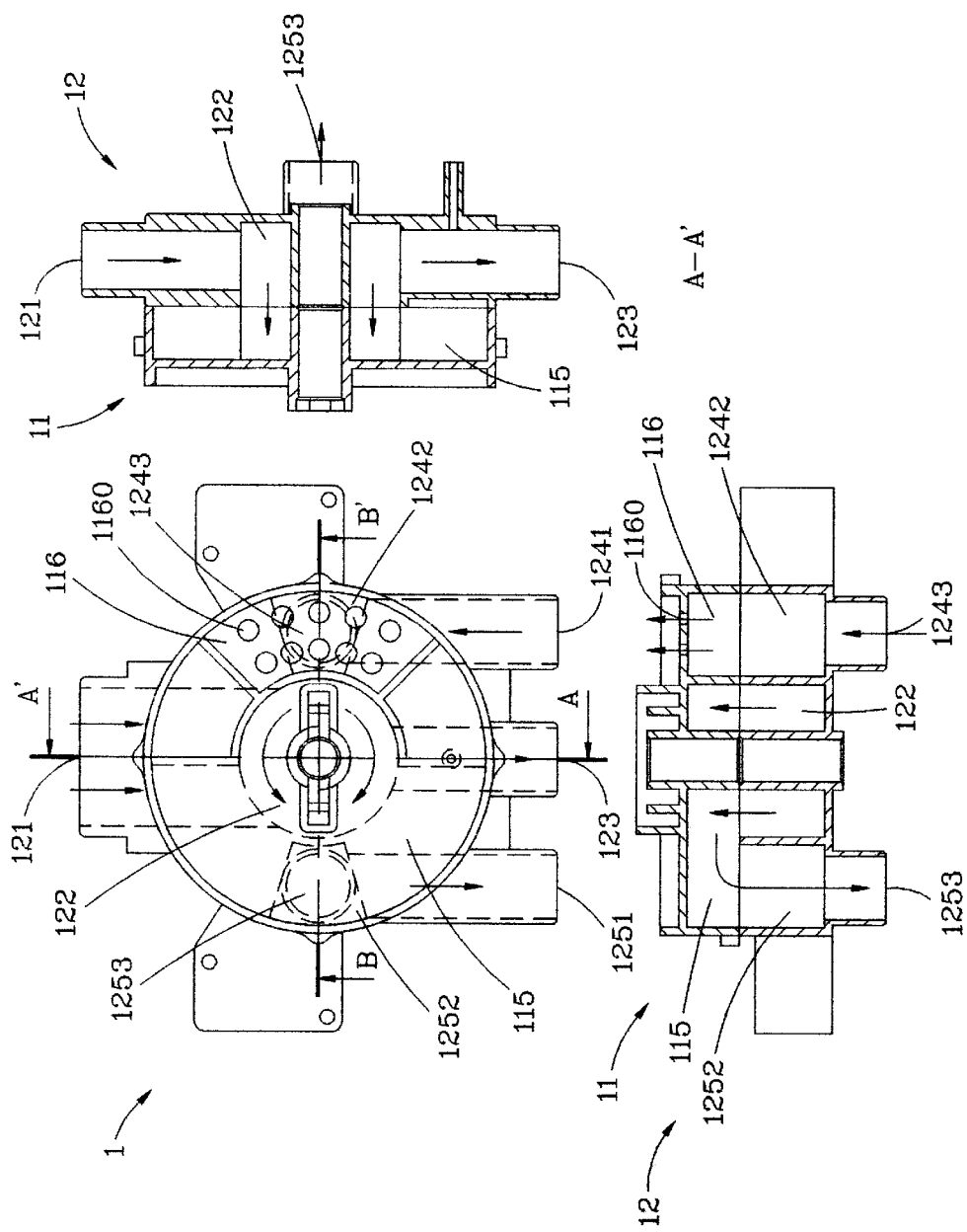
FIG. 5 is a schematic view showing the first air valve of the present invention in a state with one side aerated and the other side thereof discharged.

Referring to FIG. 5 which shows the first air valve 1 of the present invention in a state with one side thereof aerated and the other side discharged: When the upper rotation lid 11 of the first air valve 1 is in the state shown in FIG. 5, the big air chamber 115 of the upper rotation lid 11 exactly covers the annular air chamber 122 of the lower seat 12 and the air chamber 1252. The main intake 121 intakes air, air flows into the annular air chamber 122 and is led to the big air chamber 115, then gets into the air chamber 1252 to supply air for the air pipe 1251 and the lower air pipe 1253. The air chamber 1242 is covered exactly by the small air chamber 116 of the upper rotation lid 11, so that the air chamber 1242 is communicated with the small air chamber 116. The small air chamber 116 is provided on the top thereof with a plurality of discharge holes 1160. Therefore, the air chamber 1242, the air pipe 1241 and the lower air pipe 1243 will all be communicate with the outside through the small air chamber 116 and the discharge holes 1160, thus air in the air pipe 1241 and the lower air pipe 1243 are discharged.

Figure 6:
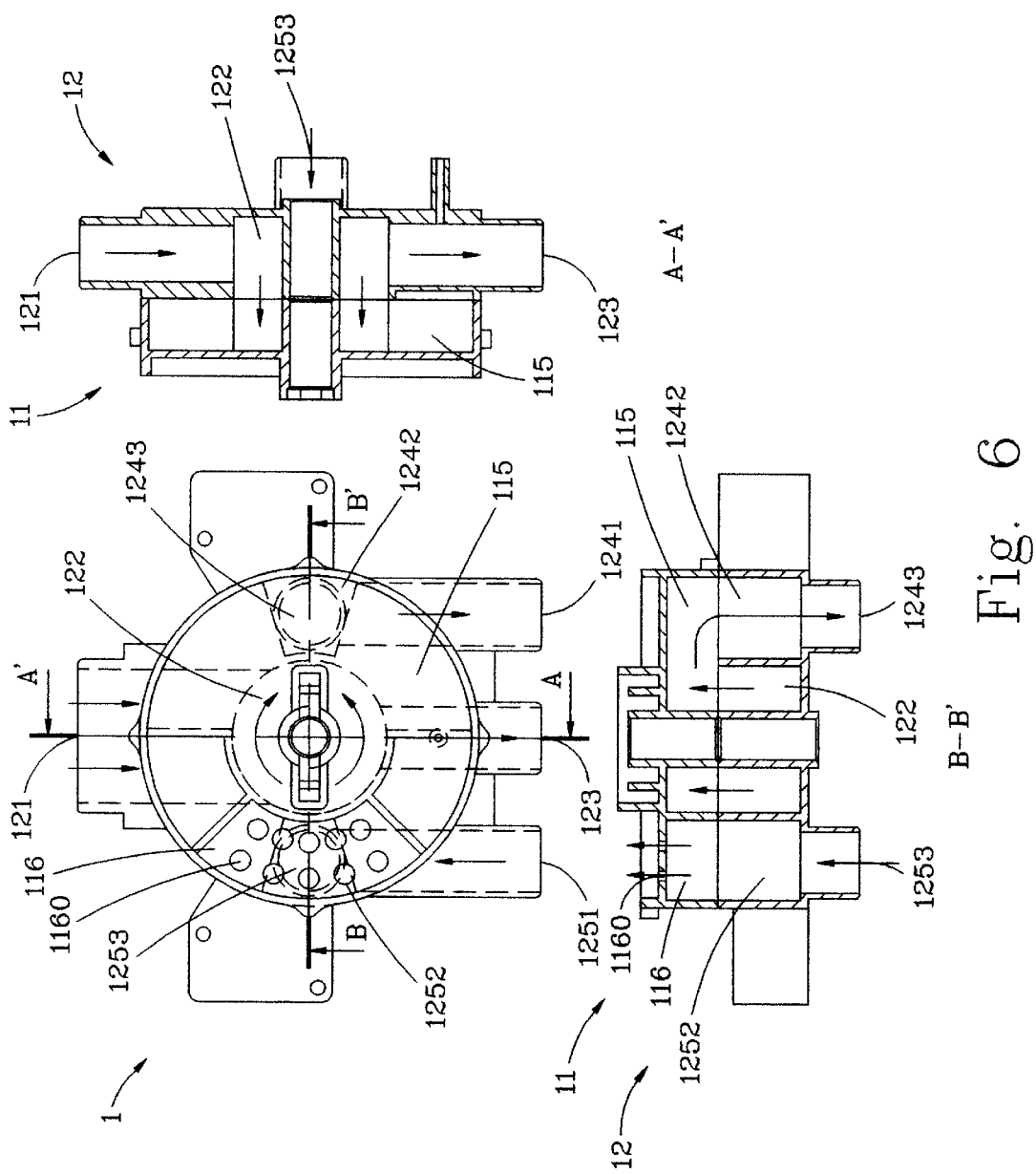
FIG. 6 is a schematic view showing the first air valve of the present invention in a state with one side discharged and the other side thereof aerated.

Referring to FIG. 6 which shows the first air valve of the present invention in a state with one side thereof discharged and the other side aerated: When the upper rotation lid 11 of the first air valve 1 is in the state shown in FIG. 6, the big air chamber 115 of the upper rotation lid 11 exactly covers the annular air chamber 122 of the lower seat 12 and the air chamber 1242. Air is taken in from the main intake 121, and flows through the annular air chamber 122 into the big air chamber 115 and then gets into the air chamber 1242. So that the air pipe 1241 and the lower air pipe 1243 are filled with air. The air chamber 1252 is covered exactly by the small air chamber 116 of the upper rotation lid 11, so that the air chamber 1252 is communicated with the small air chamber 116. The small air chamber 116 is provided on the top thereof with the discharge holes 1160. Therefore, the air chamber 1252, the air pipe 1251 and the lower air pipe 1253 will all be communicated with the outside through the small air chamber 116 and the discharge holes 1160, thus air in the air pipe 1251 and the lower air pipe 1253 are discharged.

Figure 7:
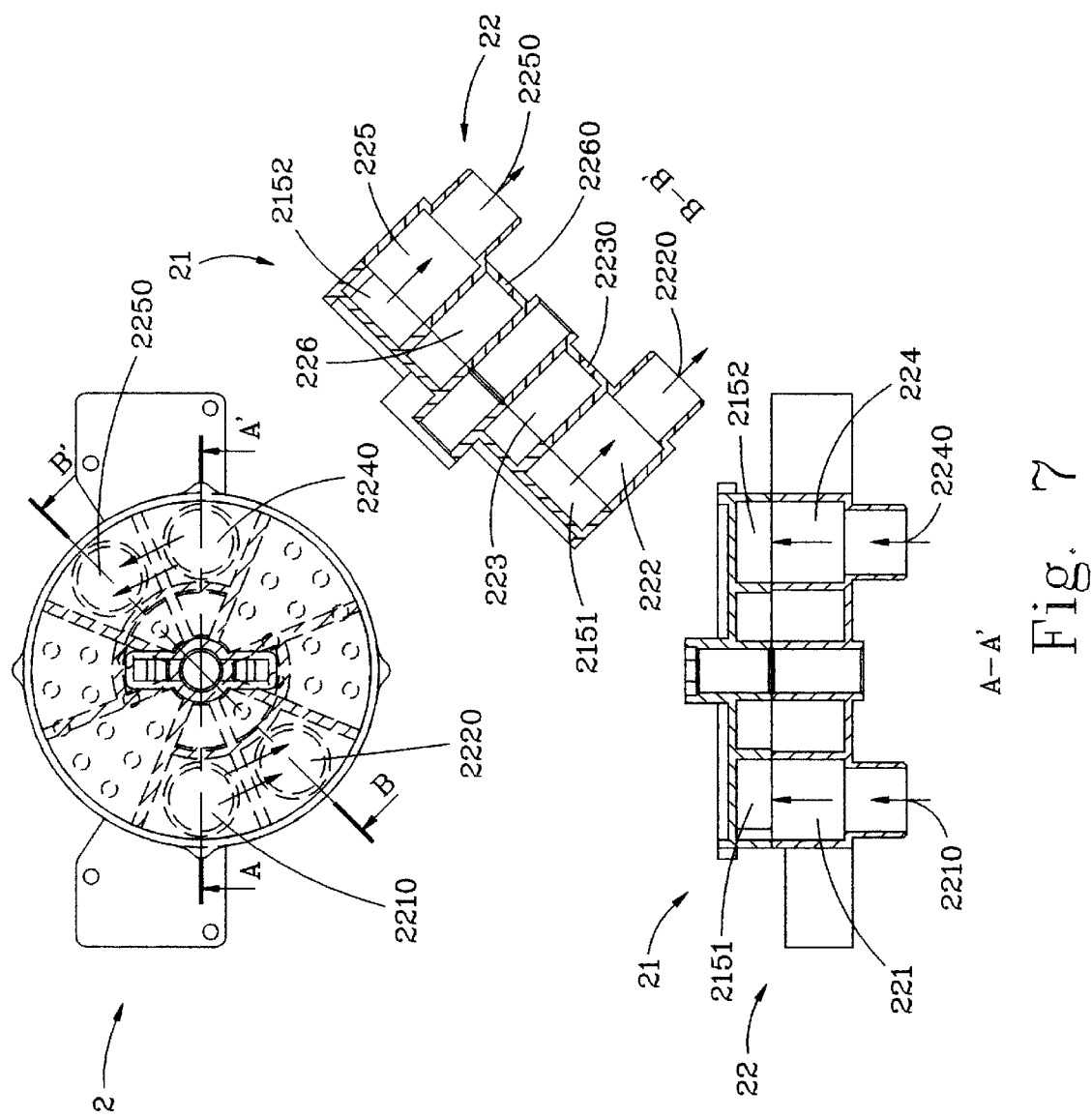
FIG. 7 is a schematic view showing the state of the second air valve of the present invention in complete aeration.

Referring to FIG. 7 which shows the state of the second air valve of the present invention in complete aeration: When the upper rotation lid 21 of the second air valve 2 is in the state shown in FIG. 7, the air chamber 2151 of the upper rotation lid 21 exactly covers the air chambers 221 and 222 of the lower seat 22. The air chamber 2152 of the upper rotation lid 21 exactly covers the air chamber 225 of the lower seat 22 and the air chamber 224. The air pipe 2210 is communicated with the air pipe 2220 through the air chambers 221, the air chamber 2151 and the air chamber 222. While the air pipe 2240 is communicated with the air pipe 2250 through the air chamber 224, the air chamber 2152 and the air chamber 225. Now the air chambers 223, 226, 2161, 2171, 2162 and 2172 are inactive.

Figure 8:
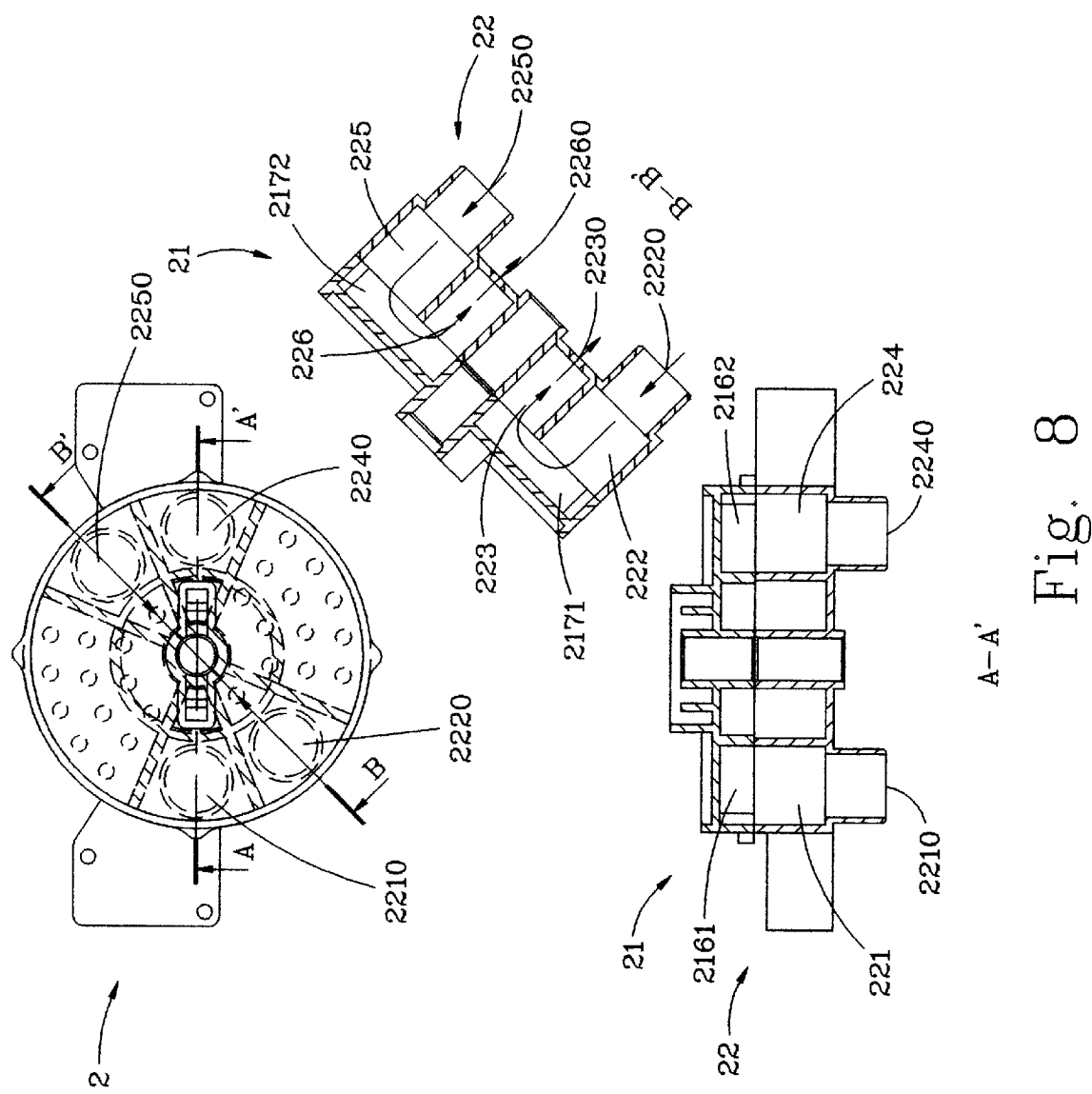
FIG. 8 is a schematic view showing the state of the second air valve of the present invention in discharging.

Referring to FIG. 8 which shows the state of the second air valve 2 of the present invention in slow discharging: When the upper rotation lid 21 of the first air valve 2 is in the state shown in FIG. 8, the air chambers 2151 and 2152 of the upper rotation lid 21 exactly cover the air chambers 226 and 223 of the lower seat 22 respectively. At this time, the air chambers 2151 and 2152 are inactive. Besides, the air chambers 2161 and 2162 cover the air chambers 221 and 224 of the lower seat 22 respectively. So that the air pipes 2210, 2240 keep in the state of non-aeration as well as non-discharging. The air chambers 222 and 225 of the lower seat 22 are covered by the air chambers 2171 and 2172 of the upper rotation lid 21. So that the air chambers 222 and 225 are communicated with the air chambers 2171 and 2172. By virtue that the areas of the air chambers 2171 and 2172 are larger respectively than those of the air chambers 222 and 225, and the tip portions of the air chambers 2171 and 2172 exactly cover the air chambers 226 and 223 respectively. Therefore, air in the air chambers 222 and 225 will be sent to the air chambers 223 and 226 through the air chambers 2171 and 2172, and is discharged from the discharge holes 2230 and 2260.

After the operations of the two air valves are described, now the effect of the two air valves are explained as below:

Aeration of a single air-bladder on both sides of the air bed: When the air bed 9 of the present invention is to become the state of aeration for both sides for lying on one's back on the bed as is the case shown in FIG. 11, the first and the second air valves 1, 2 form the states shown in FIG. 4 and 8 respectively. FIG. 4 shows the state wherein the air pipes 1251 and 1241, the lower air pipes 1253 and 1243 are all filled with air. The air pipes 1251 and 1241 supply air for the pipe lines 52 and 53, so that the air bladders 91 and 92 are aerated. The air bladder 93 is communicated with the pipe line 56, the air pipe 2220, the air chamber 223 and the discharge hole 2230 and is filled with no air. The air bladder 94 is communicated with the pipe line 57, the air pipe 2250, the air chamber 226 and the discharge hole 2260 and is also filled with no air.

Aeration of a single air bladder on one side of the air bed: When the air bed 9 of the present invention is to become the state of aeration of a single air bladder on one side of the air bed for lying on one's side on the bed (with a small turning of one's body) as is the case shown in FIG. 12, the first and the second air valves 1, 2 form the states shown in FIGS. 5 and 8 respectively. FIG. 5 shows the state wherein the air pipe 1251 and the lower air pipe 1253 are filled with air, while the air pipe 1241 and the lower air pipe 1243 are not. The air pipe 1251 and the lower air pipe 1253 supply air for the pipe line 52, so that the air bladder 91 is aerated. The air bladder 92 is communicated with the pipe line 53, the air pipe 1241, the small air chamber 116 and the discharge hole 1160 and is in a state of discharging. The air pipe 2240 is also in a state of discharging for being communicated with the pipe line 55, the lower air pipe 1243, the small air chamber 116 and the discharge hole 1160. So that the air bladder 93 is discharged through the pipe line 56, the air pipe 2220, the air chamber 223 and the discharge hole 2230. While the air bladder 94 is discharged through the pipe line 57, the air pipe 2250, the air chamber 226 and the discharge hole 2260.

Figure 9:
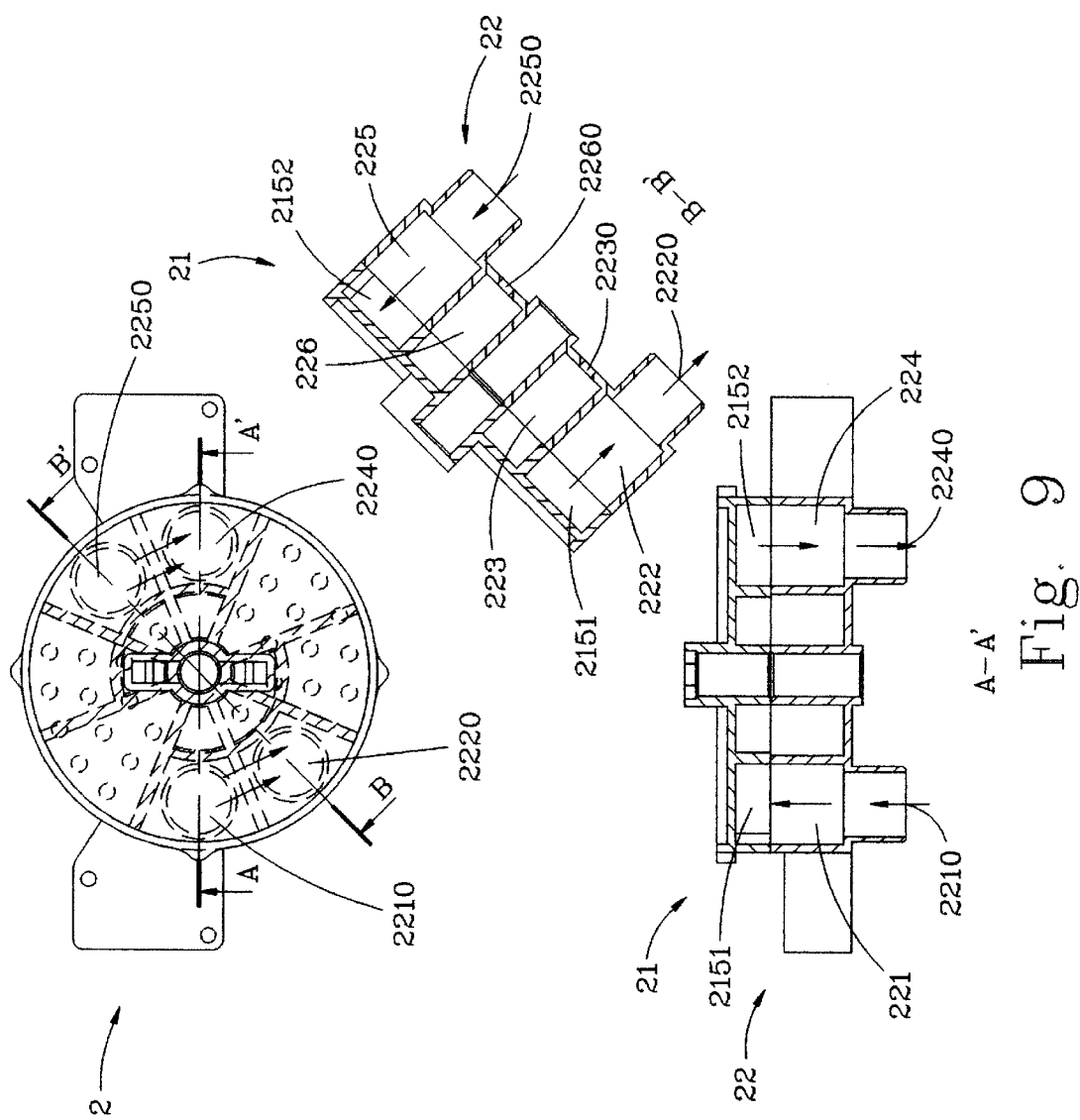
FIG. 9 is a schematic view showing the second air valve of the present invention in a state with one side aerated and the other side thereof discharged.

Aeration of both air bladders on one side of the air bed: The air bladders 91, 93 and 95 are all aerated, the air bladders 92 and 94 are not. Now a person can lie on one side of him on the bed as is the case shown in FIG. 13 (with a nearly 90-degree turning of one's body). The first and the second air valves 1, 2 form the states shown in FIGS. 5 and 9 respectively. FIG. 5 shows the state wherein the air pipe 1251 and the lower air pipe 1253 are filled with air, while the air pipe 1241 and the lower air pipe 1243 are not. The air pipe 1251 and the lower air pipe 1253 supply air for the pipe line 52, so that the air bladder 91 is aerated. The lower air pipe 1253 delivers air to the air pipe 2210 of the second air valve 2 via the pipe line 54. By virtue that the air pipes 2210 and 2220 of the second air valve 2 as shown in FIG. 9 are communicated with each other (and the air pipes 2240 and 2250 too), air getting into the air pipe 2210 is delivered to the air pipe 2220 to supply air for the pipe line 56 and the air bladder 93. The air pipe 1241 and the lower air pipe 1243 are filled with no air, so that air is not in the pipe line 53, the air bladder 92, the pipe line 55, the air pipe 2240, the air chamber 224 and the air chamber 225, nor is in the pipe line 57, the air bladder 92 and the air bladder 94.

Aeration of a single air-bladder on the other side of the air bed: The air bladders 92 and 95 are aerated, the air bladders 91, 93 and 94 are discharged. Now a person can lie on the other side of him on the bed as is the case shown in FIG. 14.

The first and the second air valves 1, 2 form the states shown in FIGS. 6 and 8 respectively. FIG. 6 shows the state wherein the air pipe 1241 and the lower air pipe 1243 are filled with air, while the air pipe 1251 and the lower air pipe 1253 are not. The air pipe 1241 and the lower air pipe 1243 supply air for the pipe line 53, so that the air bladder 92 is aerated. The lower air pipe 1243 delivers air to the air pipe 2240 of the second air valve 2 via the pipe line 55. By virtue that the air pipes 2210 and 2240 of the second air valve 2 as shown in FIG. 8 are discharged, so that no air is in the pipe lines 56, 57, the air bladder 93 and the air bladder 94.

Figure 10:
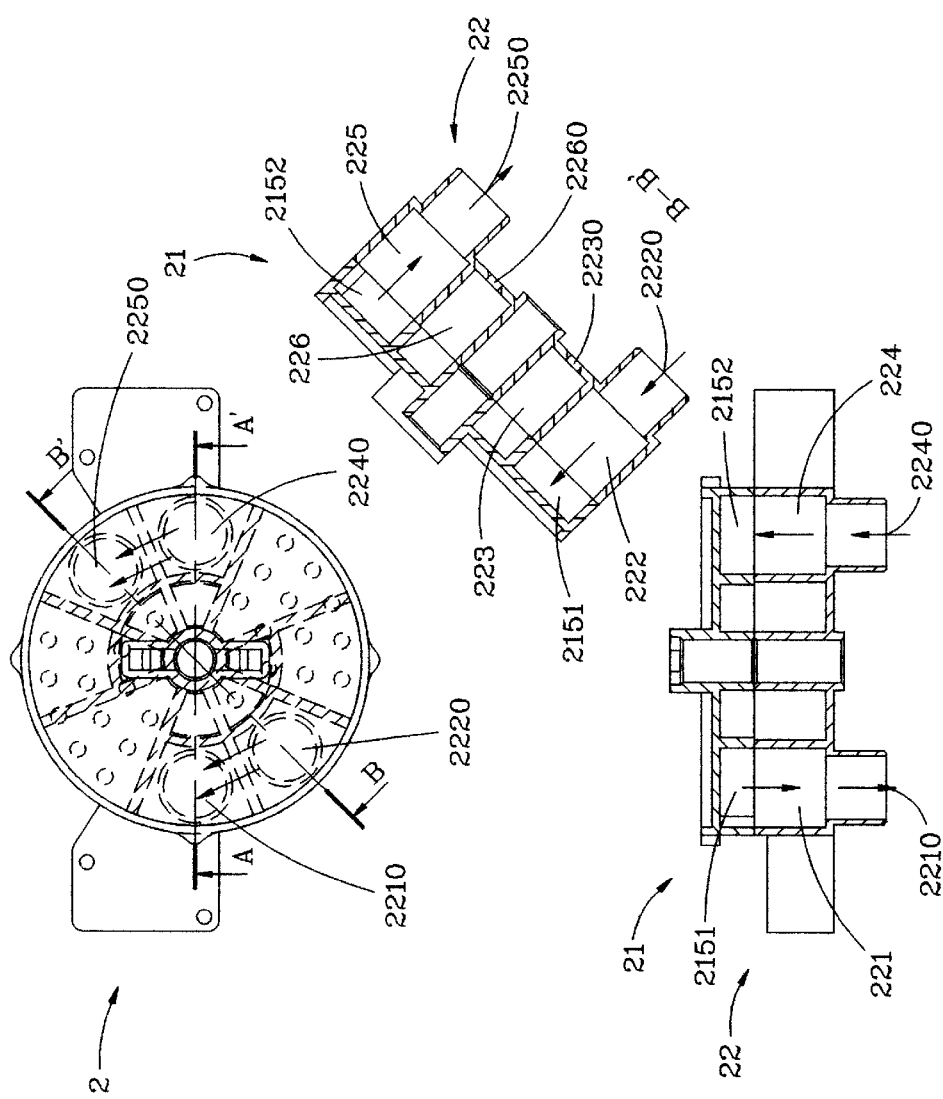
FIG. 10 is a schematic view showing the second air valve of the present invention in a state with one side discharged and the other side thereof aerated.

Aeration of both air-bladders on the other side of the air bed: The air bladder 92, 94 and 95 are all aerated, the air bladders 91 and 93 are not. Now a person can lie on the other side of him on the bed as is the case shown in FIG. 15 (with a nearly 90-degree turning of his body). The first and the second air valves 1, 2 form the states shown in FIGS. 6 and 10 respectively. FIG. 6 shows the state wherein the air pipe 1241 and the lower air pipe 1243 are filled with air, while the air pipe 1251 and the lower air pipe 1253 are not. The air pipe 1241 supplies air for the pipe lines 53, 55, so that the air bladder 92 is aerated. The lower air pipe 1243 delivers air to the air pipe 2240 of the second air valve 2 via the pipe line 55. By virtue that the air pipes 2210 and 2220 of the second air valve 2 as shown in FIG. 10 are communicated with each other, air getting into the air pipe 2220 is delivered to the air pipe 2210 to supply air for the pipe line 57 and the air bladder 94.

When in practice of the present invention, a user can use micro-switches taking advantage of the electronic circuits of the present invention depending on the states of contact of the lugs 111, 112, 113 and 114 as well as the lugs 211, 212, 213 and 214, and the micro-switches 31, 32, 33 and the micro-switches 41, 42 to get a desired state of aeration and discharging by himself without observing the above described sequences of aeration and discharging. For example, he can make a design of at least one of the following two kinds of states which can be automatically changed over.

1. Aeration of a single air bladder on both sides of the air bed (as shown in FIG. 11)□ Aeration of a single air bladder on one side of the air bed (as shown in FIG. 12)□ Aeration of a single air bladder on both sides of the air bed (as shown in FIG. 11)□ Aeration of a single air bladder on the other side of the air bed (as shown in FIG. 14)□ Aeration of a single air bladder on both sides of the air bed (as shown in FIG. 11). (This is the small tuning procedures).
2. Aeration of a single air bladder on both sides of the air bed (as shown in FIG. 11)□ Aeration of both air bladders on one side of the air bed (as shown in FIG. 13)□ Aeration of a single air bladder on both sides of the air bed (as shown in FIG. 11)□ Aeration of both air bladders on the other side of the air bed (as shown in FIG. 15)□ Aeration of a single air bladder on both sides of the air bed (as shown in FIG. 11). (This is the big tuning procedures).

For the sake of safety, when in doing any change over of any bladder in the present invention, it is important that the air bed shall recover its state of aeration of a single air bladder on both sides of the air bed to avoid falling down of the patient lying thereon.

In conclusion, the air bed structure capable of alternate lying thereon on either of one's sides of the present invention is one which provides firstly and uniquely multiple functions of, in addition to allowing lying on one's back on the bed, making small turning to lie on one's side, big turning to lie on one's side and small (big) turning to lie on the other side of a person since such product of airbed has existed. It effectively solves the defects resided in the conventional air bed, and therefore is practical and improved. Such effect can not be achieved with any product existed in the markets. The product of the present invention has never disclosed in a document nor has existed in the markets and hence is outstanding.

Having thus described my invention, what I claim as new and desire to be secured by Letters Patent of the United States are:

1. An air bed structure comprising:

first air valve, a second air valve and an air bed; wherein, said first air valve is comprised of an upper rotation lid and a lower seat, said upper rotation lid is mounted on said lower seat, said upper rotation lid and said lower seat each include at a central portion a through hole, a driving member is provided on a top surface of said upper rotation lid, said driving member includes an external motor that drives said upper rotation lid to rotate, while said lower seat maintains unmoved, said top surface of said upper rotation lid is a sealed surface, a big air chamber and a small air chamber are formed beneath said top surface, two blocks are provided between said air chambers, a top of said small air chamber is provided with a plurality of discharge holes, said upper rotation lid is provided on an external annular wall thereof with four lugs, said lower seat is provided on a wall with a transverse main intake, said lower seat is provided with an annular air chamber which is in communication with said transverse main intake, a transverse central discharge pipe is provided on an external wall of said lower seat opposite said transverse main intake and is in communication with said annular air chamber, said transverse central discharge pipe is provided at two sides thereof with a first air pipe and a second air pipe, while said annular air chamber is provided at each side thereof with an air chamber which is opened on its top, said air chambers at each side of said annular air chamber are provided on bottoms thereof with a first lower air pipe and a second lower air pipe, said first lower air pipe is in communication with an interior of said first air pipe, said second lower air pipe is in communication with an interior of said second air, said air chambers of said lower seat are provided with receiving seats for mounting a plurality of micro-switches and a pad;

said second air valve is also comprised of an upper rotation lid and a lower seat, said upper rotation lid is mounted on said lower seat, said upper rotation lid and said lower seat each include at a central portion a through hole, a driving member is provided on the top surface of said upper rotation lid, said driving member includes an external motor to drive said upper rotation lid to rotate, while said lower seat is unmoved, said top surface of said upper rotation lid is a sealed surface, a plurality of air chambers are formed beneath said top surface, said upper rotation lid is provided on an external annular wall thereof with four lugs, a bottom of said lower seat is a sealed surface, above said bottom surface there are a first air chamber, a second air chamber, a third air chamber, a fourth air chamber, a fifth air chamber and a sixth air chamber, bottoms of said third and sixth air chambers are provided with a plurality of discharge holes, bottoms of said first, second, fourth and fifth air chambers are provided with an air pipe, said lower seat is provided at outer lateral sides thereof with receiving seats for mounting two micro-switches and a pad;

said air bed is comprised of a first, a second, a third, a fourth and a fifth elongate air bladder, wherein, said first and second elongate air bladders are provided on an upper layer, while said third and fourth elongate air bladders are provided on a lower layer, said fifth elongate air bladder is provided between said upper layer and said lower layer and extends to two lateral sides of said first and second elongate air bladders, said main intake is connected to an external air supply pump, said central discharge pipe is connected to said fifth elongate air bladder via a first pipe line, said air pipe on said first air valve is connected to said first air bladder via a second pipe line, said first lower air pipe is connected to said air pipe of said first air chamber via another a third pipe line, said second vertical lower air pipe is connected to said air pipe of said fourth air chamber via a fourth pipe line, said air pipe of said second air chamber is connected to said third air bladder via a fifth pipe line, said air pipe of said fifth air chamber is connected to said fourth air bladder via a sixth pipe line; such that a user can control rotation and rotating time of said upper rotation lids of said first and second air valves to obtain a plurality of aeration states including single air-bladder aeration on both sides of said air bed, single air-bladder aeration on one side of said air bed, both air-bladder aeration on said side of said air bed, single air bladder aeration on the other side of said air bed and both air-bladder aeration on said other side of said air bed.

2. The air bed structure as stated in claim 1, wherein:

a rotating time of said upper rotation lid of said first air valve and that of said upper rotation lid of said second air valve is controlled with an electronic circuit.

* * * * *